United States Patent [19]

Smearing

[11] 3,778,536

[45] Dec. 11, 1973

[54] ELECTRICAL INSULATION

[75] Inventor: Robert W. Smearing, Ballston Lake, N.Y.

[73] Assignee: General Electric Company, Schenectady, N.Y.

[22] Filed: Dec. 20, 1971

[21] Appl. No.: 210,087

[52] U.S. Cl. ........... 174/121 SR, 156/185, 156/305, 156/330, 161/DIG. 4, 161/88, 161/93, 161/98, 161/151, 161/156, 161/175, 161/184, 161/185, 174/121 R

[51] Int. Cl. ........................ H01b 7/02, B32b 15/14

[58] Field of Search ................. 161/DIG. 4, 93, 184, 161/185, 151, 88, 98, 156; 174/120 R, 120 C, 120 SR, 121 R, 121 SR, 122 R, 122 G, 122 C, 124 R, 124 G, 124 GC

[56] References Cited

UNITED STATES PATENTS

| | | | |
|---|---|---|---|
| 2,956,613 | 10/1960 | Edelman et al. | 161/DIG. 4 |
| 3,369,947 | 2/1968 | Mertens et al. | 156/53 |
| 3,458,389 | 7/1969 | Mertens | 161/188 |
| 3,556,925 | 1/1971 | Mertens | 161/188 |
| 3,647,611 | 3/1972 | Mertens | 161/185 |
| 3,649,572 | 3/1972 | Hairston et al. | 260/2.5 F |

*Primary Examiner*—George F. Lesmes
*Assistant Examiner*—Charles E. Lipsey
*Attorney*—Howard I. Schlansker et al.

[57] ABSTRACT

The resin content and electrical insulating capability of porous insulation is enhanced by providing the outer portion of the insulation with cure accelerator for the resin impregnant whereby the outer portion cures more rapidly than the inner portion.

3 Claims, No Drawings

ELECTRICAL INSULATION

This invention relates to electrical insulation. More particularly, it relates to porous insulation such as ground insulation for electrical conductors or conductor bars which is impregnated with a resin which is then cured in place.

It is well known in the art to cure electrical conductors or conductor bars which are made up of a number of electrical conductors with an outer insulation, sometimes known as ground insulation, which typically comprises a plurality of layers of mica flake or mica paper insulation, or both, usually overlaid with an armor tape such as glass cloth to prevent fraying and destruction of the insulation in actual use. It is usual in the art to apply to the conductor or conductor bar array a plurality of layers of mica flake or mica paper tape, each of which is supported by a backer as of glass cloth or other heat-resistant fabric. There is then wrapped over the micaceous or other insulation, built up to the desired thickness dependent upon the electrical insulation requirements, one or more layers of glass cloth to act as an armor, the whole being impregnated with a resinous material which is then cured in place to provide the final ground insulation. In one method the bar is placed in a tank which is then evacuated, the resin being introduced under vacuum. Atmospheric pressure is then applied and the bar allowed to soak. Then the pressure is raised for a period of time and released to atmospheric. The bar is then removed, allowed to drain and baked to cure the resin.

While the above method of providing electrical insulation for conductor bars is adequate in many respects, it, along with other methods wherein the conductor bar is dipped in resin and then cured with heat or heat and pressure, has the disadvantage that an appreciable amount of the resin drains from the bar before or during cure, in many cases necessitating a second cycle of resin treatment before cure to provide sufficient impregnating resin and hence electrical insulating quality. It is a principal object of the present invention to provide means whereby the resin content of the resin-dipped bar is increased, in many cases obviating the necessity of more than one cycle of resin treatment.

Briefly, according to the present invention, the resin content of the porous insulation for a conductor bar or conductor is increased by providing in the outer portion, such as the armor tape portion, additional resin curing accelerator which causes the resin in the outer portion to cure more rapidly, providing in effect an impervious shell which prevents outward loss of resin and permits a slow controlled cure of the resin in the inner portions of the insulation.

Those features of the invention which are believed to be novel are set forth with particularity in the claims appended hereto. The invention will, however, be better understood and further objects and advantages appreciated from a consideration of the following description.

Any resin can be used in connection with the present invention which lends itself to relatively rapid cure through the use of cure accelerators. Typical of such materials are epoxy resins containing 1,2 epoxy groups, a phenolic accelerator in quantities between 0.1 and 15 percent by weight of the epoxy resin containing an organic titanate curing agent in quantities between 0.05 and 10 percent by weight of the expoxy resin. The concentration of the phenolic accelerator or organic titanate used with any particular resin can be varied to alter the cure rate of the epoxy resin.

The epoxy resin employed in the thermosetting resin in this invention can be any epoxy resin having 1,2 epoxy groups or mixtures of such resins as indicated, and includes cycloaliphatic epoxy resins, such as 3,4-epoxycyclohexylmethyl-(3,4-epoxy)cyclohexane carboxylate (sold under the trademarks ERL 4221 by Union Carbide Plastics Company, or Araldite CY 179 by Ciba Products Company), bis(3,4-epoxy-6-methylcyclohexylmethyl) adipate (sold under the trademarks ERL 4289 by Union Carbide Plastics Company or Araldite CY 178 by Ciba Products Company), vinylcyclohexene dioxide (ERL 4206 made by Union Carbide Plastics Company), bis(2,3-epoxycyclopentyl)ether resins (sold under the trademark ERL 4205 by Union Carbide Plastics Company), 2-(3,4-epoxy)cyclohexyl-5,5-spiro(3,4-epoxy)-cyclohexane-m-dioxane (sold under the trademark Araldite CY 175 by Ciba Products Company), glycidyl ethers of polyphenols epoxy resins, such as liquid or solid bisphenol-A diglycidyl ether epoxy resins (such as those sold under trademarks as Epon 826, Epon 828, Epon 830, Epon 1001, Epon 1002, Epon 1004, etc., by Shell Chemical Company), phenol-formaldehyde novolac polyglycidyl ether epoxy resins (such as those sold under the trademarks DEN 431, DEN 438, and DEN 439 by Dow Chemical Company), epoxy cresol novolacs (such as those sold under the trademarks ECN 1235, ECN 1273, ECN 1280 and ECN 1299 by Ciba Products Company), resorcinol glycidyl ether (such as ERE 1359 made by Ciba Products Company), tetraglycidoxy tetraphenylethane (Epon 1031 made by Shell Chemical Company), glycidyl ester epoxy resins such as diglycidyl phthalate (ED-5661 by Celanese Resins Company), diglycidyl tetrahydrophtha-late (Araldite CY 182 by Ciba Products Company) and diglycidyl hexahydrophthalate (Araldite CY 183 made by Ciba Products Company or ED-5662 made by Celanese Resins Company), and flame retardant epoxy resins such as halogen containing bisphenol-A diglycidyl ether epoxy resins (e.g., DER 542 and DER 511 which have bromine contents of 44–48 and 18–20 percent, respectively, and are made by Dow Chemical Company).

The foregoing epoxy resins are well known in the art and are set forth, for example, in many patents including U.S. Pat. Nos. 2,324,483; 2,444,333; 2,494,295; 2,500,600; and 2,511,913. Moreover, it often is advantageous to employ mixtures of these epoxy resins, e.g., a glycidyl ether epoxy resin such as Epon 828 with a cycloaliphatic epoxy resin such as ERL 4221, to control the cure rate of the thermosetting resin. The hardeners of this invention are not only effective with various epoxy resins and mixtures of expoxy resins, but they are also effective in mixtures containing reactive and nonreactive epoxy diluents (or extenders), epoxy flexibilizers and fillers. Thus, while epoxy resin hardeners of the prior art are effective with only a select group of epoxy resins, the epoxy resin hardeners of this invention (to be more fully explained hereinafter) are effective for cross-linking all groups of epoxy resins.

The hardener for the epoxy resin impregnant generally consists of a mixture of an organic titanate and a phenolic accelerator wherein the phenolic accelerator is present in quantities less than 15 percent by weight of the epoxy resin. Among the phenolic accelerators which can be effectively used in this invention are bisphenol-A [i.e., 2,2-bis(4-hydroxyphenyl)propane], pyrogallol, dihydroxy-diphenyls as well as ortho-, meta-, and para- hydroxybenzaldehydes (such as salicylaldehyde), catechol, resorcinol, hydroquinone, and phenol-formaldehyde and resorcinol-formaldehyde condensates. Examples of other phenolic accelerators suitably employed for the resin impregnant also include halogenated phenols such as ortho-, meta-, and para- chlorophenols or bromophenols, and ortho-, meta-, and para-nitrophenols. Desirably, the phenolic accelerator is present in concentrations between 0.1 and 15 percent by weight of the epoxy resin with optimum cure rates being produced with phenolic accelerator concentrations between 0.5 and 10 percent by weight of the epoxy resin. In general, the cure rate of the epoxy resin can be altered by varying the weight percentage of phenolic accelerator employed with the epoxy resin or by an alteration in the phenolic accelerator-epoxy resin combination. For example, the cure rate of ERL 4221-titanate-bisphenol-A solutions can be significantly increased by substituting a phenol-formaldehyde novolac accelerator for the bisphenol-A accelerator. Similarly, by substituting the phenol-formaldehyde novolac in the ERL 4221-titanate-novolac solution with catechol, the rate of cure can again be markedly increased. Within each epoxy-titanate-phenolic combination, the cure rate generally can be increased by increasing the relative phenolic content. By substituting the cycloaliphatic epoxy resin ERL 4221 with a diglycidyl ether epoxy resin such as Epon 828, the cure rate is decreased. Although the cure rate can be varied over a very wide range, the cured resins are tough solids with excellent electrical insulating properties.

The organic titanate added to the epoxy resin to assist the phenolic accelerator in controllably hardening the epoxy resin preferably is a chelated titanate such as acetylacetonate titanate, lactate titanate, triethanolamine titanate, polyhydroxystearate titanate, a glycolate titanate (e.g., tetraoctylene glycol titanate containing approximately 7.8 percent Ti and sold under the trademark Tyzor OG by E.I. duPont de Nemours and Company, or di-n-butyl hexylene glycol titanate), or a chelate stabilized with a nitrogen containing polymer (e.g., Tyzor WR sold by E.I. duPont de Nemours & Company). By use of chelated titanates, the thermosetting resin can be employed in areas having a substantial water content in the ambient atmosphere. When the thermosetting resin is applied in an atmosphere having substantially zero humidity, non-chelated titanates such as tetraisopropyl titanate, tetrabutyl titanate, polymerized tetrabutyl titanate, and tetrakis (2-ethylhexyl) titanate also can be employed for the epoxy resin hardener. Chelated titanates, such as acetylacetonate titanate, tetraoctylene glycol titanate and di-n-butyl hexylene glycol titanate, however, are preferred for the epoxy resin hardener to provide a homogeneous mixture while exhibiting resistance to hydrolyzation under humid conditions. In general, the chosen titanate should be present in the mixture in a concentration between 0.05 and 10 percent by weight of the epoxy resin with optimum cure rates generally being obtained utilizing titanate concentrations between 0.2 and 5 percent by weight of the epoxy resin.

The resin, phenolic accelerator and titanate chosen for the thermosetting impregnating resin can be mixed in any conventional fashion. A liquid phenolic can be dissolved in the epoxy resin or in the titanate either at room temperature or at elevated temperatures. A solid phenolic accelerator in powdered form also can be dissolved in the epoxy resin at room temperature by continuous agitation prior to mixing with the chosen titanate or a liquid concentrate can be formed by dissolving the powdered phenol in part of the epoxy resin at temperatures between 150° and 160°C whereafter the liquid solution is mixed with the remainder of the epoxy resin. Alternately, the solid phenolic accelerator can be dissolved in the titanate at temperatures of 100°–160°C whereupon the phenolic accelerator/titanate mixture is added to the epoxy resin to effect hardening.

It has been found that the inclusion in the outer portion of the porous insulation, as in the armor tape fabric, of a phenolic novolac cure accelerator having a functionality of from about 4 to 8 provides the rapid cure of the outer portion of the resin impregnated insulation in accordance with the present invention. Phenolic novolacs are very simply made. They can, for example, be prepared by fluxing together 100 parts of phenol, 70 parts of formalin and about 0.3 part by weight of 5 normal hydrochloric acid. After about 2 hours, the water is distilled off and the temperature raised to about 150°C until the desired functionality is obtained. The material is then quickly cooled to obtain a glassy, brittle material. Among the phenolic novolacs which are useful in the present connection are a 6 to 7 functionality phenol novolac manufactured by Union Carbide and known as BXRW—2756. Also useful is a 4 to 5 functionality phenol novolac manufactured by Ashland Chemical and known as EP—32210—14—3. Others will occur to those skilled in the art.

In contrast to these useful materials, it has been found that resorcinol, which is a cure accelerator for the basic impregnating resin, is not useful in the present connection because it is soluble in the resinous material and so does not remain in situ selectively to more rapidly cure the resin in the outer portions of the insulation. Likewise, it has been found that such materials as epoxy novolacs, such as Dow DEN—439, are not useful either alone or in connection with other typical accelerators such as resorcinol.

The following examples will illustrate the practice of the present invention, it being realized that they are to be taken as exemplary only and not as limiting in any way.

There were fashioned two conductor bar arrays each having 20 pieces of enameled copper wire. One conductor bar was wrapped with three layers of one-half lapped glass fabric armor tape three-fourths inch wide and 3 mils thick. The other conductor bar was covered with two layers of armor tape plus an additional layer of armor tape which had been washed with a 10 percent of weight solution of phenolic novolac cure accelerator, specifically Union Carbide BXRW—2756. About 3 percent by weight of cure accelerator based on the glass fabric remained on the glass. Generally, about 1 to 5 percent by weight of residual cure accelerator is preferred. The two bars were soaked for 1 hour in an epoxy resin composition consisting of 97 parts by weight of ERL—4221, 2 parts Tyzor OG and 1 part bisphenol-A. The bars were drained for 1 hour and then cured at 150°C for 4 hours. The cured resin content of the armor tape on the bar having the uncatalyzed outer layer was 2.3 grams, while the resin content of the tape having the outer catalyzed layer was 2.75 grams. At 150°C the gel time of the above resin with no phenolic novolac cure accelerator was 74.1 minutes. When a 10 percent by weight solution of phenolic novolac, specifically BXRW—2756 of Union Carbide, was employed in the outer armor layer, the gel time was reduced to 8.4 minutes. When there was substituted for this particular phenolic novolac Ashland Chemical EP—322-10—14—3, the gel time was 3.5 minutes.

In addition to an increase in resin pick-up of about 20 percent as illustrated above, and in addition to the quick gel time which in effect forms a skin over the outer portion of the bar preventing the escape of resin during curing, conductor bars insulated according to the present invention retain their desirable electrical characteristics including dissipation factor. When two layers of mica paper tape were half-lapped on a form wound coil, with one layer of half-lapped untreated glass fabric armor tape dipped in resin as above, and given two treatments of the above resin and cured, the 10 volt per mil dissipation factor was 0.83 and the 100 volt per mil dissipation factor was 2.63. When the layer of armor tape was catalyzed as above with BXRW-2756 phenolic novolac, the 10 volt per mil dissipation factor was 0.82 and the 100 volt per mil dissipation factor was 2.42.

There is provided, then, by the present invention improved means for the electrical insulation of conductor bars whereby by reason of the cure accelerator containing outer layer, the resin content and electrical insulating capability of the electrical insulation are increased.

What I claim as new and desire to secure by Letters Patent of the United States is:

1. In an electrical conductor having insulation thereon comprising a purality of insulating layers, said conductor being prepared by impregnating the layers with curable resin having a cure accelerator incorporated therein and subsequently curing said resin, the improvement consisting essentially of providing the outer layer of said insulation with additional cure accelerator over that in said resin prior to impregnation with the resin, whereby the impregnating resin introduced into said outer layer is cured more rapidly than the impregnating resin introduced into the inner layer or layers, thus providing a seal to prevent loss of resin from said inner layer or layers during cure, said additional cure accelerator being substantially insoluble in the impregnating resin and present only in the outer insulating layer.

2. An electrical conductor as in claim 1 wherein said outer layer is glass fabric.

3. An electrical conductor as in claim 1 wherein said resin is an epoxy resin having 1,2 epoxy groups and said cure accelerator is phenolic novolac having a functionality of from about 4 to 8.

* * * * *